United States Patent
St. Louis

(10) Patent No.: US 7,581,608 B2
(45) Date of Patent: Sep. 1, 2009

(54) LEVITATING PLATFORM

(76) Inventor: Daniel Mark St. Louis, 345 Via Cantilena, Camarillo, CA (US) 93012

(*) Notice: Subject to any disclaimer, the term of this patent is extended or adjusted under 35 U.S.C. 154(b) by 560 days.

(21) Appl. No.: 10/544,039

(22) PCT Filed: Feb. 4, 2004

(86) PCT No.: PCT/US2004/003137

§ 371 (c)(1), (2), (4) Date: Jul. 29, 2005

(87) PCT Pub. No.: WO2005/023615

PCT Pub. Date: Mar. 17, 2005

(65) Prior Publication Data

US 2007/0017722 A1    Jan. 25, 2007

Related U.S. Application Data

(60) Provisional application No. 60/445,399, filed on Feb. 7, 2003.

(51) Int. Cl.
*B60V 3/00*    (2006.01)

(52) U.S. Cl. ........................ 180/116; 180/117; 180/119; 180/120; 180/124

(58) Field of Classification Search .................. 180/116, 180/117, 119, 120, 124
See application file for complete search history.

(56) References Cited

U.S. PATENT DOCUMENTS

| | | | | |
|---|---|---|---|---|
| 2,953,321 A | * | 9/1960 | Robertson et al. | 244/23 C |
| 4,043,421 A | * | 8/1977 | Smith | 180/117 |
| 4,537,372 A | * | 8/1985 | Forizs | 244/12.4 |
| 5,026,002 A | * | 6/1991 | Yarrington | 244/12.1 |
| 5,152,478 A | * | 10/1992 | Cycon et al. | 244/12.2 |
| 5,178,344 A | * | 1/1993 | Dlouhy | 244/12.2 |
| 5,738,302 A | * | 4/1998 | Freeland | 244/23 R |
| 5,803,199 A | * | 9/1998 | Walter | 180/120 |
| 6,082,478 A | * | 7/2000 | Walter et al. | 180/120 |
| 6,464,459 B2 | * | 10/2002 | Illingworth | 415/208.2 |

* cited by examiner

*Primary Examiner*—Lesley D. Morris
*Assistant Examiner*—Michael R Stabley
(74) *Attorney, Agent, or Firm*—Melanius D'Souza

(57) ABSTRACT

A levitating platform, which is capable of stable flight, is disclosed. Levitating platform (100) comprises a platform structure (110), which includes a bottom extended surface (116) and a lip (114). An air movement device (120) is mounted on platform structure (110) to flow air (30) into plenum (123) between support surface (20), bottom extended surface (116) and lip (114). The flow of air (30) in plenum (123) creates positive and negative pressures within plenum (123). The positive and negative pressures generate attractive and repelling forces between platform structure (110) and support surface (20) causing platform structure (110) to levitate off support surface (20) in a stable, easily controllable manner.

9 Claims, 9 Drawing Sheets

LEVITATING PLATFORM

CLAIM OF PRIORITY

This application claims priority from U.S. Provisional Patent Application No. 60/445,399 filed on Feb. 7, 2003.

FIELD OF THE INVENTION

The present invention relates generally, to levitating platforms. More specifically, the present invention relates to levitating platforms that can be used to safely and economically transport human beings, cargo, and other payloads over all kinds of terrain. The present invention can also be used as an attractor device to non-contactingly support work-pieces or provide a means for maintaining non-contact spacing between two objects. On a miniature scale, the present invention can also be used as a toy.

BACKGROUND OF THE INVENTION

Today, many types of aircraft, such as airplanes, helicopters, "wing in ground effect" (WIG) craft, gyrocopters, hovercraft, powered parachutes, etc. exist Some of these such as airplanes and helicopters are in widespread commercial use. However, no one type of aircraft has gained widespread personal use compared to the widespread use of other personal vehicles such as automobiles, motorcycles, snowmobiles, or personal watercraft. Well-known reasons such as high costs, extensive training requirements, limited accessibility, operating space requirements, and perceived safety risk account for the lack of widespread personal use of such aircraft.

Currently, the most commonly used vertical take-off or landing (VTOL) aircraft are helicopters and hovercrafts. However, these aircraft also have a number of well-known disadvantages, which have prevented their widespread use as a personal use aircraft.

As evidenced by the many prior-art patents on the subject, there has been a great deal of effort to develop a safe, inherently stable, compact, economical, easily portable, easily storable, easy-to-use, low-altitude flight-capable VTOL human/cargo transporter. For example, U.S. Pat. No. 2,953,321 to Robertson et. al. describes unique flying craft that was developed by the Hiller Helicopter Corporation in the 1950's, and became known as the Hiller Flying Platform. The Hiller flying Platform had limited technical success and was never commercialized.

Several other concepts exist for personal flying machines and/or unmanned aerial vehicles (that might be adapted for carrying people), which could be classed as "flying platform" craft. As described, these craft were supposedly capable of vertical takeoff and landing and free flight. Some of these concepts are described in the following US patents: U.S. Pat. No. 4,0043,421 "Air Car"; U.S. Pat. No. 4,47,024 "Airborne Vehicle"; U.S. Pat. No. 4,537,372 "VTOL Aircraft"; U.S. Pat. No. 5,026,002 "Helihover Amphibious Aircraft"; U.S. Pat. No. 5,152 478 "Unmanned Flight Vehicle etc."; U.S. Pat. No. 5,178,344 "VTOL Aircraft"; U.S.Pat. No. 5,738,302 "Airborne Vehicle"; U.S. Pat. No. 5,803,199 "Lift Augmented Ground Effect Platform"; U.S. Pat. No. 6,082,478 "Lift Augmented Ground Effect Platform"; "Personal Air Transport";; U.S. Pat. No. 6,464,459 "Lifting Platform With Energy Recover". None of these craft concepts have been successful commercially, particularly in regards to being applied to a personal use aircraft.

To develop the invention claimed herein, the applicant has carried out extensive scale model testing of the inventive concepts described in some of the above-listed patents. However, the applicant was unable to experimentally substantiate the operating performance claimed in these patents because of fundamental flaws in the designs or underlying theories of the competing inventive concepts.

There is therefore a need for a personal aircraft which is capable of taking off and landing almost anywhere, is easy to fly, requires only minimal training to be operated safely, can be operated over any terrain, is inherently stable, is inherently safe, is easy to store and transport, is perceived by the general population to be safe, and is affordable.

SUMMARY OF THE INVENTION

In one aspect of the present invention, a levitating platform is disclosed which comprises a flow means for the passage of a fluid into a platform structure, which is arranged around the flow means. The fluid could be air, water or any other suitable fluid, which follows Bernoulli's principles. The flow means could be a flow conduit or a fluid pump such as a blower or a propeller fan or a turbine. The platform structure has an extended flow surface past which the fluid can flow during operation of the levitating platform. The extended flow surface can have any suitable contour such as flat, curved, geometric, or complex A protuberance boundary is arranged around the extended surface to deflect the flow of the fluid as it flows past the extended sure. During operation, the levitating platform is placed on a supporting surface so that a generally enclosed plenum is formed between the extended surface, the protuberance boundary, and the opposing surface. When the fluid is flowed into the plenum, it creates positive and negative pressure within the plenum. The positive pressure produces a repelling force between the levitating platform and the opposing surface causing the levitating platform to move away from the opposing surface. The negative pressure produces an attracting force between the levitating platform and the opposing surface causing the levitating platform to move towards the opposing surface. At any particular flow of the fluid, an equilibrium point is reached at which the attracting forces, the repelling forces, and external forces such as gravity are balanced. At the equilibrium point, the levitating platform is held in a stable manner at a constant distance away from the opposing surface.

In one aspect of the present invention, the opposing surface is fixed and the platform structure is allowed to move relative to the opposing surface. An application of this aspect of the present invention relates to a flying platform for transporting humans, cargo, and other payloads over terrestrial surfaces or for use as a toy.

In one aspect of the present invention, the platform structure has a geometric plan-form such as a circle, an oval, or a regular/irregular polygon. In another aspect of the present invention, the platform structure has a non-geometric plan-form.

In another aspect of the present invention, the flow means comprises a fluid flow port In another aspect of the present invention, the flow means comprises a fluid flow conduit, which is connected at its first end to the fluid flow port and at its second end to a source of fluid. In another aspect of the present invention, the source of fluid comprises a fluid-pump. In another aspect of the present invention, the fluid-pump comprises an air-fan. In another aspect of the present invention, the air-fan comprises propeller blades. In another aspect of the present invention, the air-fan comprises a blower impeller. In another aspect of the present invention, the air fan comprises a ducted air fan.

In another aspect of the present invention, the ratio of the area of the extended surface to the area of the fluid flow port is greater than 0.01 and less than 1000.

In another aspect of the present invention, the protuberance comprises a rigid material of construction. In another aspect of the present invention, the protuberance comprises a semi-rigid material of construction. In another aspect of the present invention, the protuberance comprises a lip. In another aspect of the present invention, the protuberance comprises a lift-enhancing element. In another aspect of the present invention, the protuberance comprises an airfoil element. In another aspect of the present invention, the protuberance comprises a ribbon. In another aspect of the present invention, the protuberance comprises a flexible skirt In another aspect of the present invention, the levitating platform is used as an attractor to non-contactingly hold a work-piece at a fixed distance away from the levitating platform. In this application, the levitating platform is held fixed by any suitable conventional attachment means and the work-piece is allowed to move relative to the levitating platform When the fluid is passed into the plenum defined by the extended surface, the protuberance boundary, and the opposing surface of the work-piece, positive and negative pressure are created within the plenum. The positive pressure produces a repelling force between the levitating platform and the opposing surface causing the work-piece to move away from the opposing surface. The negative pressure produces an attracting force between the levitating platform and the opposing surface causing the work-piece to move towards the opposing surface. At any particular flow of the fluid, an equilibrium point is reached at which the attracting forces, the repelling forces, and external forces such as gravity are balanced. At the equilibrium point, the work-piece is held in a stable manner at a constant distance away from the levitating platform.

In another aspect of the present invention which is used as an attractor, the flow means comprises a fluid flow port and a fluid flow conduit connected at its first end to the fluid flow port and at its second end to a source of fluid.

Yet another aspect of the present invention discloses a method for the generation of attracting and repelling forces between a levitating platform and an opposing surface. In this aspect of the present invention, the levitating platform comprises a flow means for the passage of a fluid into a platform structure which is arranged around the flow means. The fluid could be air, water or any other suitable fluid, which follows Bernoulli's principles. The flow means could be a flow conduit or a fluid pump such as a blower or a propeller fan or a turbine. The platform structure has an extended flow surface past which the fluid can flow during operation of the levitating platform. The extended flow surface can have any suitable contour such as flat, curved, geometric, or complex. A protuberance boundary is arranged around the extended surface to deflect the flow of the fluid as it flows past the extended surface. The method includes the first step of placing the levitating platform on a supporting surface so that a generally enclosed plenum is formed between the extended surface, the protuberance boundary, and the opposing surface. The method also includes the second step of flowing the fluid into the plenum so that positive and negative pressure is created within the plenum. The positive pressure produces a repelling force between the levitating platform and the opposing surface causing the levitating platform to move away from the opposing surface. The negative pressure produces an attracting force between the levitating platform and the opposing surface causing the levitating platform to move towards the opposing surface. At any particular flow of the fluid, an equilibrium point is reached at which the attracting forces, the repelling forces, and external forces such as gravity are balanced. At the equilibrium point, the levitating platform is held in a stable manner at a constant distance away from the opposing surface.

These and other features, aspects, and advantages of the present invention will be better understood with reference to the following description and drawings wherein like parts have been given like reference numbers.

DETAILED DESCRIPTION

As defined herein, a "Levitating Platform" is a device, which operates on the basis of "Levitational Fluid Dynamics" principles. Levitational fluid dynamics principles relate to the ability of a fluid to create attractive and repelling forces between two objects. Using levitational fluid dynamics principles, the levitating platform can be made to operate in a Levitating mode wherein the repelling forces dominate to enable a freely moving levitating platform to move relative to a fixed opposing surface. Alternately, the levitating platform can be made to operate in an Attractor mode wherein the attractive forces dominate to enable a finely moving work-piece to move relative to a fixed levitating platform The inventive concepts described herein have been validated by extensive model testing in the laboratory and outdoor testing of a full-size prototype of a human transporting levitating platform. The levitational fluid dynamics of the present invention will be first described followed by a description of the bench-scale models and a full-sized prototype of a levitating platform that were built and tested by the applicant.

Through extensive cogitation and model-testing, the applicant has discovered novel principles of levitational fluid dynamics, which are explained with reference to FIGS. 1, 2A, 2B, 3A, 3B, 4A, and 4B.

Figure 1:
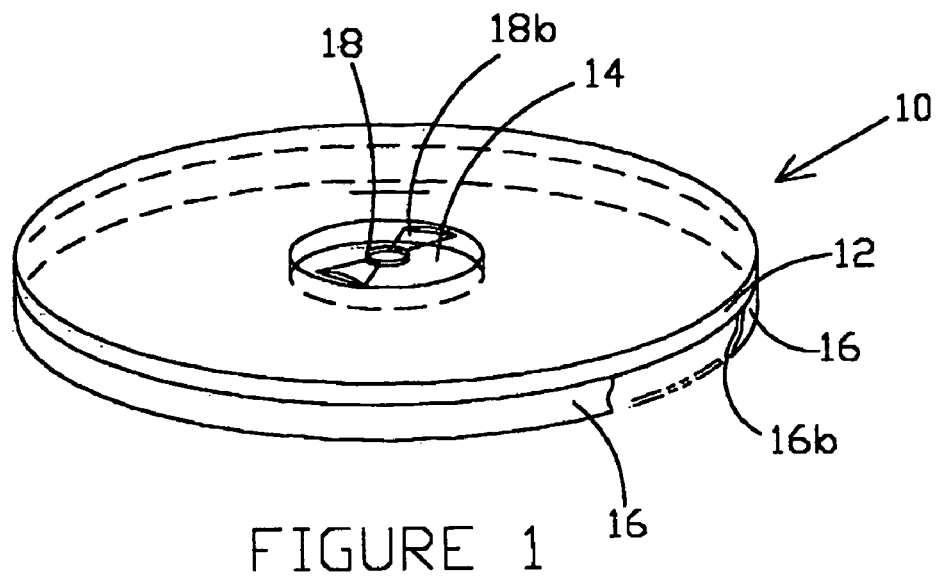
FIG. 1 represents an isometric general representation of a levitating platform according to the present invention.
Figure 2A:
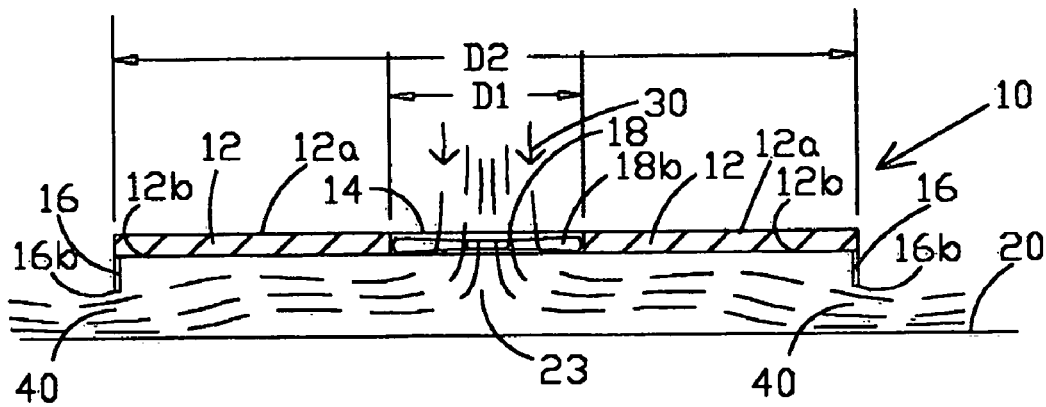
FIG. 2A represents a first equilibrium position of the levitating platform of FIG. 1.
Figure 2B:
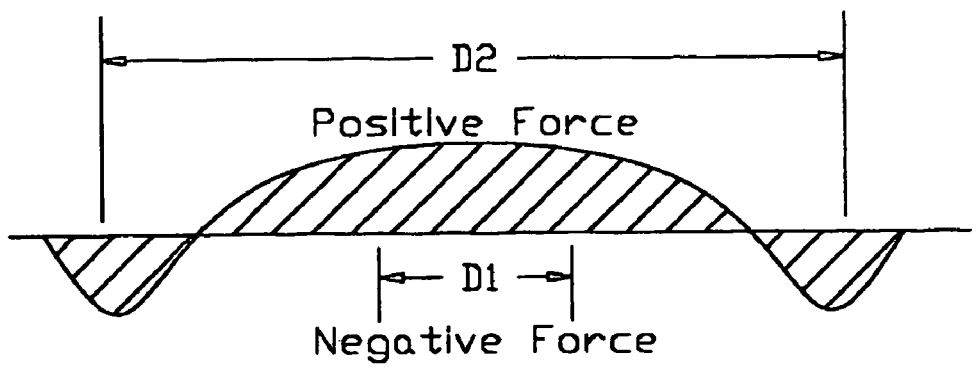
FIG. 2B is a graphical representation of the attractive and repulsive forces generated by the fluid flow in the first-equilibrium position of the levitating platform shown in FIG. 2A.

Refer now to FIGS. 1 and 2A which show a general representation of the levitating platform of the present invention. FIG. 1 shows a general isometric representation of a levitating platform 10 which is configured as a disc 12 having a diameter D2 and a concentric flow port 14 of diameter D1. Levitating platform 10 can be made of any suitable construction material such as plastic, wood, metal, etc. Disc 12 has an upper surface 12a and a lower surface 12b. A lip 16 having a lower edge 16b is provided along the periphery of disc 12. A flow means such as a propeller fan 18 having blades 18b is located within concentric flow port 14 to blow air downwardly through disc 12.

FIG. 2A shows a longitudinal cross-sectional representation of levitating platform 10 of FIG. 1. In this figure, levitating platform 10 is shown floating, in a, first equilibrium position above flat supporting surface 20. Disc 12, lip 16, and supporting surface 20 cooperate to create a generally closed plenum 23 into which air 30 can be blown by propeller fan 18. Air 30 is represented in FIG. 2A by dashed lines which represent the streamlines of air 30 as it enters through flow port 14, flows through plenum 23, and exits through gap 40 between lower edge 16b of lip 16 and supporting surface 20.

For the sake of simplicity, levitating platform 10 has been shown as a circular plan-form shape in FIG. 1A. However, levitating platform 10 could be configured with any other plan-form shape such as oval or rectangular, or square, or hexagonal, or any other regular or irregular geometric or non-geometric plan-form shape without departing from the spirit of the invention. Further, lip 16 can be any closed peripheral protuberance, which impedes the flow of air horizontally over lower surface 12b of disc 12. Such a protuberance could be any shape, such as a ridge, a ribbon, a bump, etc. Alternately, the protuberance could also be any suitable aerodynamic shape, such as an airfoil to enhance the lift in the peripheral region of disc 12. It is not necessary that the protuberance be located at the periphery of disc 12 as shown in FIGS. 1 and 2A. The protuberance can be located anywhere between the periphery of port 14 and the outer periphery of disc 12.

Also any suitable air-moving device, instead of a propeller fan, can be used as the flow means in levitating platform 10, without deviating from the results discussed hereunder. It is not necessary that the air-moving device be attached to disc 12 as shown in FIG. 1A. The air-moving device can be located remotely and the air could be communicated to concentric opening 14 by a suitable conduit Levitating platform 10 can also be operated on any fluid, which follows Bernoulli's principle, besides air as described with respect to FIGS. 1 and 2A.

The area of lower surface 12b which is between the circumference of port 14 and the inner circumference of lip 16 is referred to as an "extended surface" in this description and clams. While this extended surface is shown as flat in FIGS. 1A and 1B, it could have any contour such as flat, curved, geometric, or complex.

Refer now to FIG. 2A, which shows levitating platform 10 in an first equilibrium position. It should be noted that the exact fluid dynamics, which result in the levitation of the levitating platform have not be fully determined. Therefore, the following description of the levitational fluid dynamics of the levitating-platform is quite hypothetical and could change with further empirical analysis.

FIG. 2A shows the equilibrium position of levitating platform 10 when a small volume of air 30 is blown into plenum 23 by propeller fan 18. As shown in FIG. 2A, air 30, represented by the dashed streamlines, flows through plenum 23. However, lip 30 creates a resistance to the flow of air 30 within plenum 23, which results in a build up of static pressure under the levitating platform. Lip 30 also causes the flow of air 30 to accelerate in the horizontal plane. Bernoulli's principle indicates that the increase in velocity will result in a reduction in pressure, which creates an attractive force between disc 12 and supporting surface 20. It should be noted that lip 16 is important for achieving levitation. Without lip 16, the horizontal velocity is high across all of the extended surface and the attractive forces are very high. Therefore, without lip 16, the equilibrium height of the disc 12 from support surface 20 is very low. However, in a levitating platform application, it is desired that the equilibrium height of disc 12 from support surface 20 be high. Lip 16 produces a static lift which creates a repulsive force which somewhat negates the attractive forces and increases the equilibrium height of disc 12 from support surface 20.

Figure 3A:
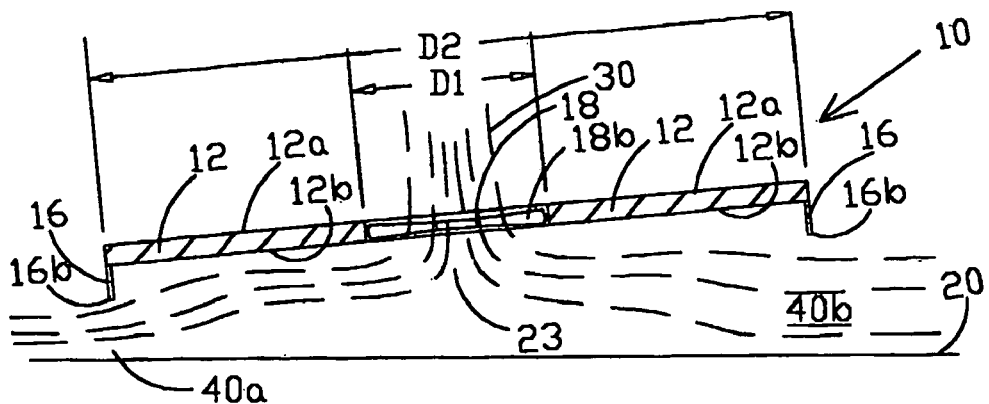
FIG. 3A represents the levitating platform of FIG. 2, which is in a temporary tilted operating position because of an external influence.
Figure 3B:
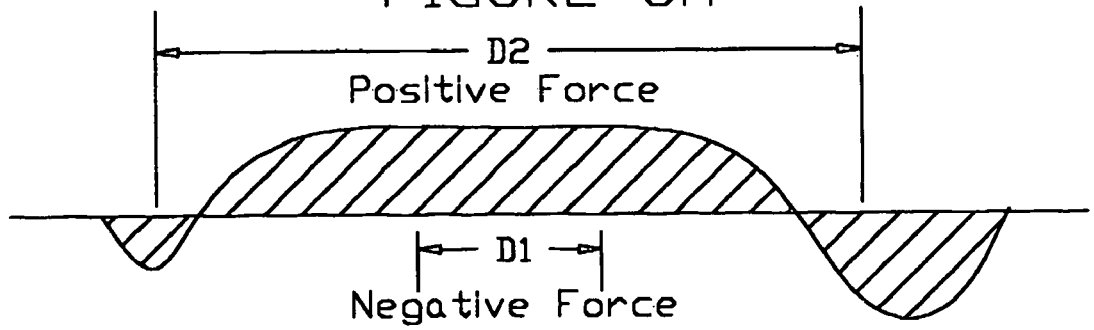
FIG. 3B is a graphical representation of the attractive and repulsive forces generated by the fluid flow in the tilted operating position of the levitating platform shown in FIG. 3A.

The presence of these attractive and repulsive forces has been demonstrated to provide greater stability to levitating platform 10 of the present art compared to lifting platforms of the prior art. For example, FIG. 3A shows levitating platform 10 when it is tilted to a non-equilibrium position by an external force such as a gust of wind. As shown in FIG. 3A, the tilting of levitating platform results in a small gap 40a and a large gap 40b on diametrically opposite sides of disc 12. The presence of large gap 40b reduces the resistance to the flow of air 30 on the high side of disc 12. This reduction of resistance results in an increase in the horizontal velocity of air 30 towards larger gap 40b compared to the horizontal velocity of air 30 towards smaller gap 40a. The higher horizontal velocity of the high side creates a lower pressure within plenum 23 in the region adjacent to larger gap 40b. This lower pressure in turn creates a restoring moment which brings levitating platform 10 back to the first equilibrium position as shown in FIG. 2A. FIG. 3B graphically represents the force distribution in plenum 23 during the tilted position of levitating platform 10 shown in FIG. 3A.

Figure 4A:
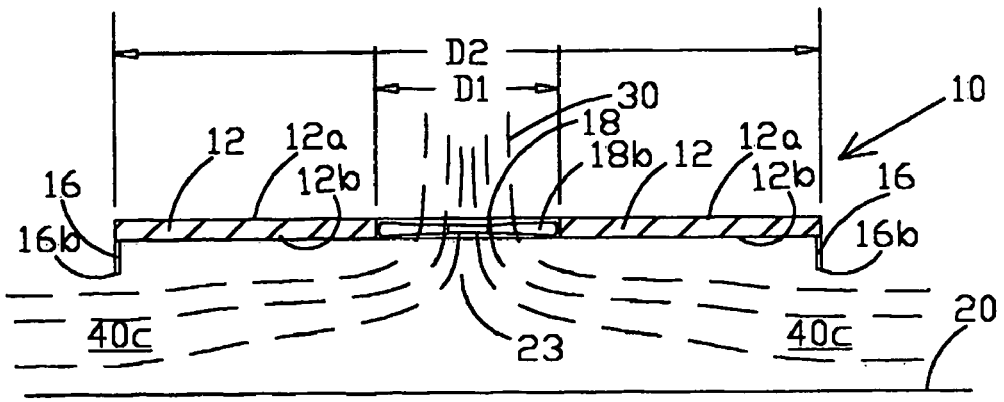
FIG. 4A represents the levitating platform of FIG. 1, in a second equilibrium position.
Figure 4B:
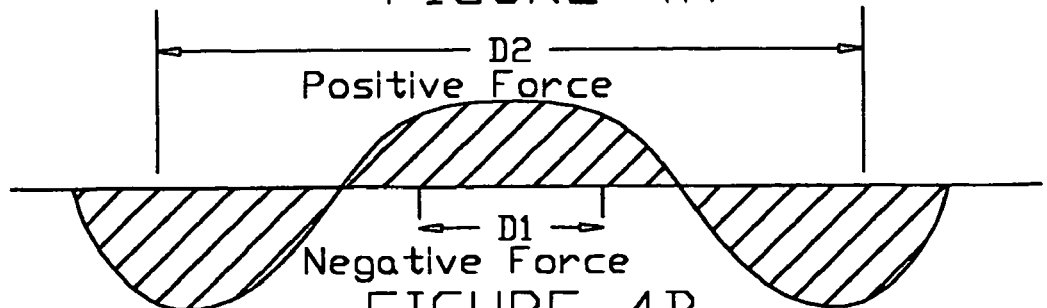
FIG. 4B is a graphical representation of the attractive and repulsive forces generated by the fluid flow in the final levitating position of the levitating platform shown in FIG. 4A.

FIG. 4A shows levitating platform 10 when a larger gap 40c is created between lower edge 16b of lip 16 and supporting surface 20. The presence of larger gap 40c reduces the static pressure within plenum 23. With larger gap 40c, the net force which attracts disc 12 towards the working surface increases relative to the repulsive forces which repel disc 12 away from the working surface 20. FIG. 4B graphically represents the force distribution in plenum 23 when levitating platform 10 is in the elevated position of FIG. 4A. The balance of the attractive and repulsive forces maintains levitating platform 10 in a more stable elevated operating position when compared to the elevated operating positions of lifting platforms of the prior art.

This above theory has been supported by testing of scale models and a full-size prototype of the levitating platform of the present invention. These scale models and full-size prototype have demonstrated much greater pitch, roll, and elevation stability than were demonstrated in lifting platforms of the prior art.

Applicant has empirically verified the presence of the attractive and repulsive forces described above in FIGS. 1, 2A, 2B, 3A, 3B, 4A and 4B. Attached Tables 1A to 1C show the results of the verification experiments carried out by the applicant.

Figure 5:
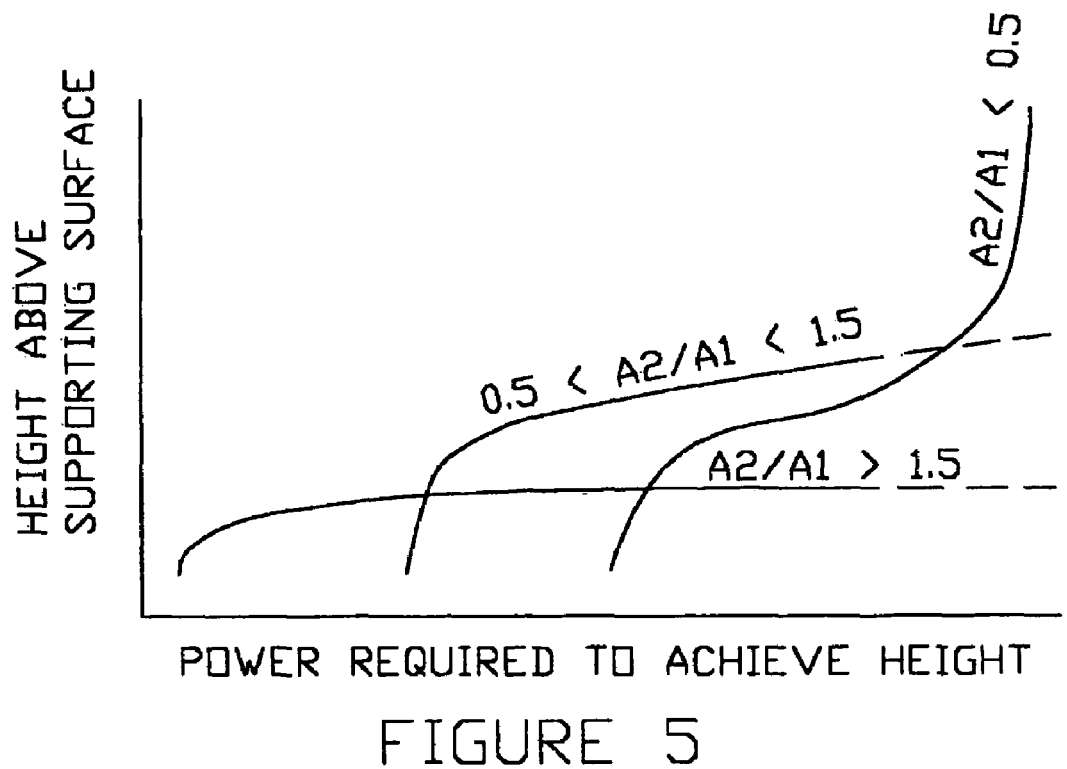
FIG. 5 is a graphical representation of the relationship between engine power consumption and levitating height as a function of the ratio of the extended area surface A2 to the flow area A1 of the fan in levitating platforms of the present invention.

The scale models used for these tests were similar to levitating platform 10 described above in FIG. 1. Disc 12 was constructed of styrofoam. In the tests shown in Table 1A, air movement device 18 was a Zinger 14×4 wooden 2-bladed propeller fan which was modified to a 260 mm (10.25 inch) diameter. In the tests shown in Table 1B, air movement device 18 was a 63.5 mm (2.5 inch) propeller fan. In the tests shown in Table 1C, air movement device 18 was two sets of counter-rotating Zinger 14×4 wooden 2-bladed propellers. The propellers in all of the three sets of tests were driven by electric motors whose power consumption was measured using a voltage meter. FIG. 5 shows the general representation of the relationship between engine power consumption and levitating height as a function of the ratio of the extended area surface A2 to the flow area A1 of the fan.

Based upon these tests, the applicant has demonstrated that the levitating platform of the present invention has more stable levitating performance than the lifting platforms of the prior art.

The following is a brief description of the constructional details of a prototype of a full-scale levitating platform that was built by and tested by the applicant in 2003. The levitating platform is intended for use as a human transporter but it could also be use for transporting cargo and other payloads. A miniature version of this prototype could also be used as toy.

Figure 6A:
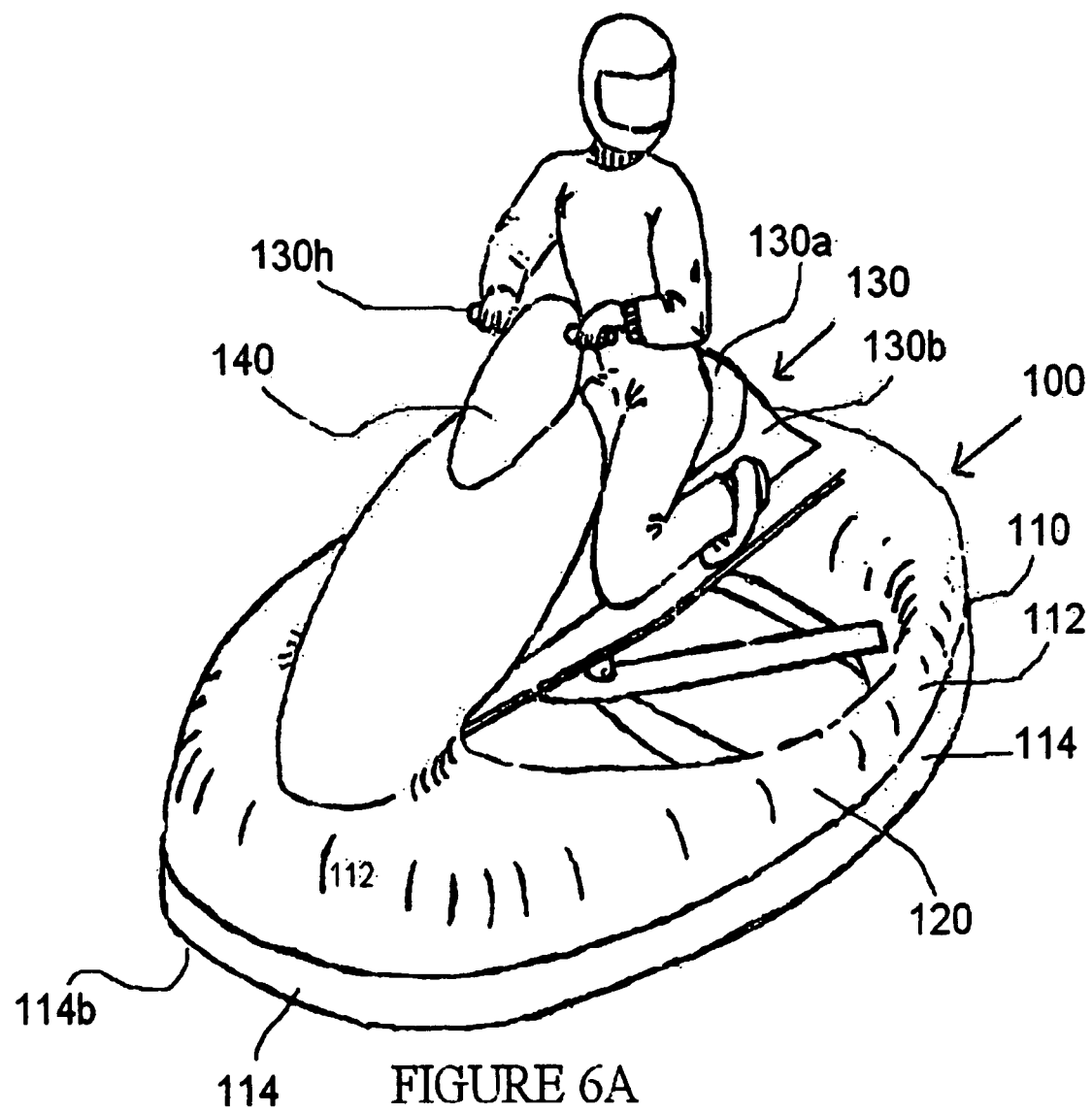
FIGS. 6A represents an isometric arrangement of a human transporting levitating platform prototype.
Figure 6B:
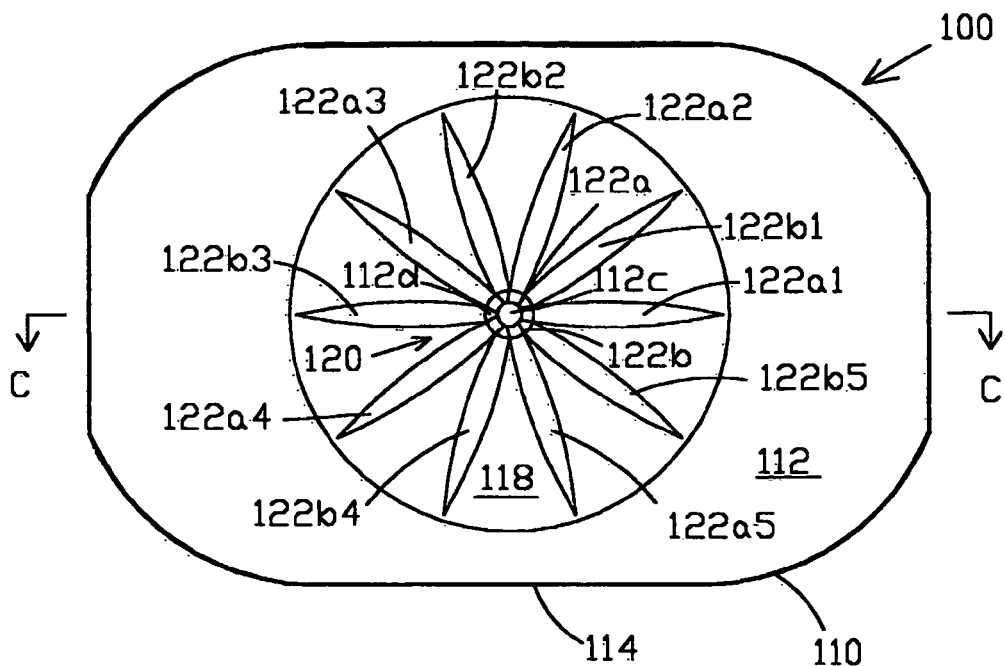
FIGS. 6B, 6C, and 6D represent the plan-view, the longitudinal cross-sectional view, and the transverse cross-sectional view of the human transporting levitating platform prototype of FIG. 6A.
Figure 6C:
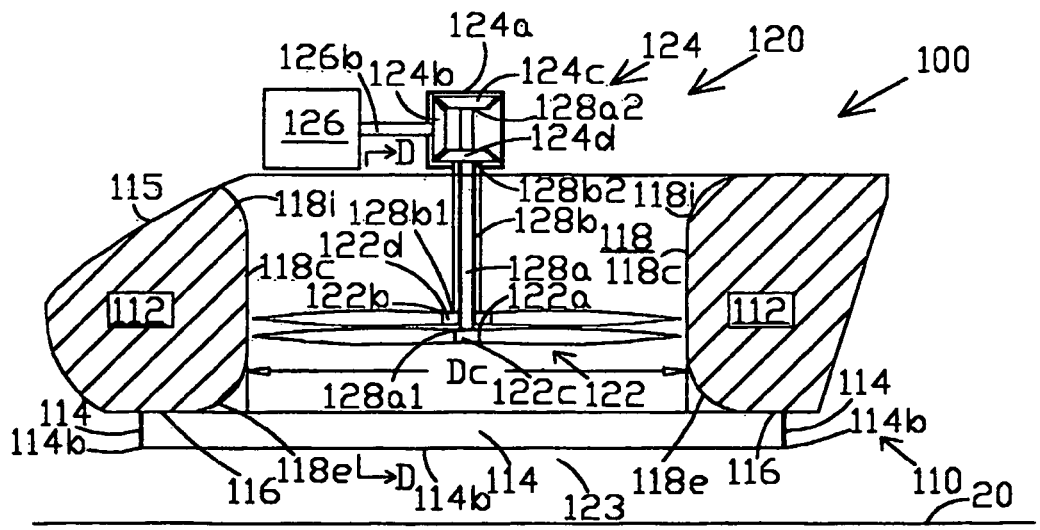
Figure 6D:
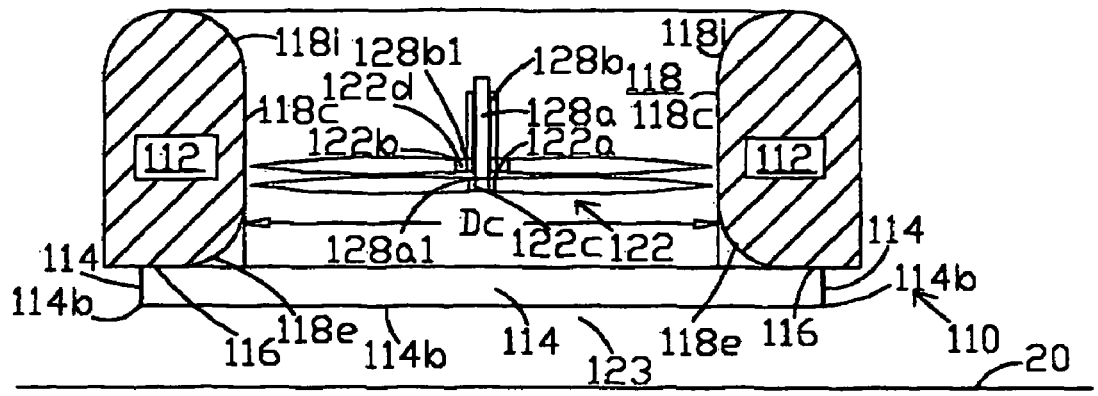

FIG. 6A shows an isometric representation of the prototype. FIGS. 6B, 6C and 6D show a plan-view representation, a longitudinal cross-sectional representation, and a transverse cross-sectional representation respectively of the prototype. The general configuration and operation of the prototype is similar to the configuration of the small-scale models described in FIGS. 1, 2A, 3A, and 4A. However, as will be described below, the prototype was adapted for human operation and transportation.

Referring to FIGS. 6A, 6B, 6C, and 6D, human transporting levitating platform prototype (HTLPP) 100 comprises at least a platform structure (PS) 110 and an air-movement device 120. Human transporting levitating platform prototype 100 also includes a rider support system 130 and a steering mechanism 140 even though these elements are not essential to the operation of human transporting levitating platform prototype 100.

Platform structure 110 is configured as a wedge-shaped body 112 whose overall dimensions are 2.13 meters (7 feet) wide by 3.5 meters (11.5 feet) long by 0.6meters (2 feet) thick. Body 112 was contoured to provide a race-car like aerodynamic profile 115 at the top and a flat surface 116 at its bottom. A monocoque construction using fiberglass over polyurethane foam was used in the fabrication of body 112. This particular wedge-shape was selected to provide an aerodynamic profile to monocoque body 112. However, it will be obvious that other aerodynamic profiles would be used for monocoque body 112 without deviating from the spirit of the invention.

As shown in FIGS. 6A, 6C, and 6D, a lip 114 is attached to the lower surface 116 of monocoque body 112. Lip 114 is constructed of nylon-reinforced urethane fabric and is attached to flat surface 116 by fasteners or some other suitable attaching means with a tight fit to the body to form a good seal. As previously described, lip 114, and lower surface 116 of monocoque body 112 cooperate with support surface 20 to provide air-plenum 123.

An air-flow port (AFP) 118 is provided in monocoque body 112 to contain the air movement device 120. Air-flow port 118 is configured similar to a doughnut hole whose plan-view diameter is coincident with the major axis of monocoque body 112. As will be described later, a set of propeller blades is located in air-flow port 118 to force air into plenum 123 during operation of human transporting levitating platform prototype 100.

To provide optimal performance of the propeller blades, air-flow port 118 is configured similar to the scroll of a ducted propeller fan. Therefore, air-flow port 118 is configured with a bell-mouthed inlet 118$i$, a straight cylindrical side 118$c$, and a bell-mouthed exit 118$e$. For optimal performance, the internal diameter "Dc" of cylindrical side 118$c$ is selected to provide close clearance between the outermost tips of the propeller blades and internal sides of cylindrical side 118$c$. Generally, a clearance of about 4 to 6 mm is contemplated to provide optimal performance of the propeller blades. Air-flow port 118 is reinforced with structural members (not shown) and a suitable lining of fiberglass or such other lightweight, high-strength material (not shown) as is typical in aircraft construction. To reduce damage due to entrained dust and other solid particles in the air, the lining can be further coated with a protective coating (not shown) of a hard composite material such as Kevlar. Alternately, the protective coating could be a metallic film. Such constructional techniques are well known in the art.

Air movement device 120 is mounted on monocoque body 112. Air movement device 120 comprises a fan arrangement 122, which is connected by a gear arrangement 124 to an internal-combustion engine 126.

Fan arrangement 122 comprises a first 5-bladed fan 122$a$ and a second 5-bladed fan 122$b$. Each blade of fans 122$a$ and 122$b$ is 1,829 mm (72 inches) in diameter. Further, each fan blade 122$a$1 to 122$a$5 of fan 122$a$ is independently adjustable in pitch Similarly, each fan blade 122$b$1 to 122$b$5 of fan 122$b$ is also independently adjustable in pitch. Fan blades 122$a$1 to 122$a$5 are mounted on hub 122$c$ and fan blades 122$b$1 to 122$b$5 are mounted on hub 122$d$. Fan blades 122$a$1 to 122$a$5 and 122$b$1 to 122$b$5 and hubs 122$c$ and 122$c$ were procured from Warp Drive Products Inc., U.S.A. The hubs are made of aluminum and the propeller fan blades are made of carbon-fiber composite. However other materials of construction such as wood, aluminum, or fiberglass could also be used for the hubs and the propeller blades. Further, as is common in the art, the leading edge of the propellers can be coated with an abrasion resistant material such as Kevlar to reduce damage to the propellers from entrained dust in the air.

Hubs 122$c$ and 122$d$ are attached to the first ends 128$a$1 and 128$b$1 of counter-rotating concentric shafts 128$a$ and 128$b$ respectively. As shown in FIG. 2$c$, shaft 128$b$ is configured as a hollow steel pipe while shaft 128$a$ is configured as a solid steel rod, which is guided through shaft 128$b$ to provide concentric operation. As will be described below, concentric shafts 128$a$ and 128$b$ are connected to the torque output side of gear arrangement 124. Thus fans 122$a$ and 122$b$ rotate in opposite directions. Two counter-rotating fans were used in human transporting levitating platform prototype 100 because the prior art indicated that it would provide greater operating stability to the craft. However, subsequent scale-model tests have indicated that a single fan arrangement could provide an adequately stable operation. It is therefore contemplated that a simpler single-fan arrangement may be used in commercial versions of the lifting platform of the present invention instead of the 2-fan arrangement described above.

As shown in FIG. 6B, gear arrangement 124 comprises three steel bevel gears 124b, 124c, and 124d, which are mounted in casing 124a. First bevel gear 124b is attached to the output shaft 126b of internal combustion engine 126. Second bevel gear 124d has a concentric bore for the through, non-contacting passage of shaft 128a. Second bevel gear 124c and third bevel gear 124d are rotatingly coupled to first bevel gear 124b such that second bevel gear 124c counter-rotates relative to third bevel gear 124d. As shown in FIG. 6B, second bevel gear 124c is attached to second end 128a2 of shaft 128a. Similarly, third bevel gear 124d is attached to the second end 128b2 of shaft 128b. Thus, when first bevel gear 124b is rotating in a clockwise direction, it rotates second bevel gear 124c also in a clockwise direction and further rotates third bevel gear 124d in a counter-clockwise direction. Thereby, shafts 128a and 128b, and consequently fans 122a and 122b, also rotate in clockwise and counter-clockwise directions respectively. As will be obvious to one of ordinary skill in the art, suitable lubrication systems (not shown) can be incorporated in gear arrangement 124 to reduce friction-induced damage to the gears.

Internal combustion engine 126 is a 600 CC fuel injected motorcycle engine from a 1991 Honda F4 motorcycle. The maximum horsepower is estimated to be approximately 115 HP at the crankshaft The estimated power to the propellers after going through the motorcycle transmission and the custom built gear box is approximately 90 HP. Internal combustion engine 126 is mounted on structural support members (not shown) on monocoque body 112. The torque output shaft 126b of internal combustion engine 126 is connected to bevel gear 124b of gear arrangement 124.

Rider support system (RSS) 130 comprises a saddle 130a, which is attached to levitating platform 112 by connecting structure 130b. Rider support system 130 also comprised handlebars 130h for further support of the rider who maneuvers the craft by shifting his weight in the desired direction of movement. Alternately, handlebars 130h could also be attached to steering mechanism 140 for craft maneuverability. Alternatively, rider support system 130 could comprise a platform wherein the rider can stand while being transported. Yet further, rider support system 130 could comprise a chair or any other reclining device for tile support of the rider in a comfortable reclining position.

Steering mechanism 140 comprises paddles such as those described in the aforementioned patent to Robertson et. al. The design and construction of such steering mechanisms is well known in the art. Alternately, the craft can be yaw controlled by changing the pitch of the propeller blades in fans 122a and 122b to provide a differential torque. Human transporting levitating platform prototype 100 was tested in a California dry-lake bed near Edwards Air Force base by the applicant in 2003 and was found to have excellent stability, maneuverability, and altitude characteristics compared to lifting platforms of the prior art. As built and tested, human transporting levitating platform prototype 100 had the following statistics: Length 3.5 meters (11.5 feet); Width 2.13 meters (7 feet); Weight 327.3 kgs. (720 lbs) with fuel but excluding pilot; Pilot weight 82 kgs (180 lbs); Duct Area 2.65 sq. meters (28.5 sq. ft.); and maximum lower surface area 4.09 sq. meters (44 sq. ft.) which excludes duct area.

Applicant tested three variations of the configuration of human transporting levitating platform prototype 100. These variations and tests are described below:

Test 1: In this test, lip 114 was attached to the lower outermost perimeter of monocoque body 112 to provide approximately 4.09 sq. meters (44 sq. ft) squarish oval shape of lifting surface under monocoque body 112.

In Test 1, human transporting levitating platform prototype 100 levitated at about 102 to 127 mm (4 to 5 inches) from the ground when measured from the bottom edge 114b of lip 114. At this operating altitude, human transporting levitating platform prototype 100 was very, very stable. The rider's weight shift actions had a small effect on tilting the craft The levitating height did not increase noticeably with increased power. This variation of human transporting levitating platform prototype 100 took the least power to become airborne.

Test 2: In this test, lip 114 was moved inwards from the perimeter of monocoque body 112 to provide approximately 2.05 sq. meters (22 sq. ft.) approximately elliptically shaped lifting surface, which was slightly offset towards back of craft, under monocoque body 112. Thus, air-plenum 123 under monocoque body 112 was slightly offset towards its back end.

In Test 2, human transporting levitating platform prototype 100 levitated at about 152 mm (6 inches) from the ground when measured from the bottom edge 114b of lip 114. It was still quite stable but responded better to rider's weight shift actions than the variation in Test 1, which had a moderate effect on tilting the craft. The levitating height did increase a little with increased power. This variation took more power to become airborne compared to the variation of Test 1. The offset of air-plenum 23 gave human transporting levitating platform prototype 100 a bias for forward flight. When powered up, the human transporting levitating platform prototype 100 would tilt forward and accelerate forward modestly.

Test 3: In this test, lip 114 was attached further inwards from the perimeter of monocoque body 112 to provide an approximately elliptically shaped lifting surface of about 1.31 sq. meters (13 sq. f), which was very slightly offset towards the back-end of monocoque body 112. Thus air-plenum 123 under monocoque body 112 was very slightly offset towards the back end of monocoque body 112.

In Test 3, human transporting levitating platform prototype 100 levitated at about 203 mm (8 inches) from the ground when measured from bottom edge 114b of lip 114. At this altitude, human transporting levitating platform prototype 100 was still stable. The rider's weight shift actions were fairly effective for tilting the craft. The levitating height did increase noticeably with increased power. This variation took the most power to become airborne. The slight offset provided a forward tilt bias as expected.

The tests of human transporting levitating platform prototype 100 indicate that the flight characteristics of the full size craft are very similar to the flight characteristics of the scale-models described previously. It is therefore contemplated that the performance of the scale-model is a good qualitative predictor for the performance of the full size craft.

Figure 7A:
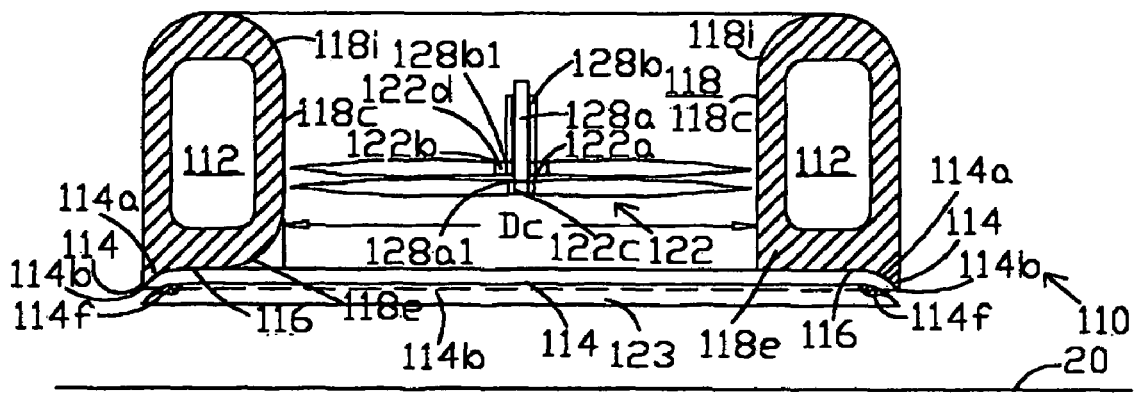
FIGS. 7A and 7B represent the transverse cross-sectional views of alternate configurations of the human transporting levitating platform prototype of FIG. 6A.
Figure 7B:
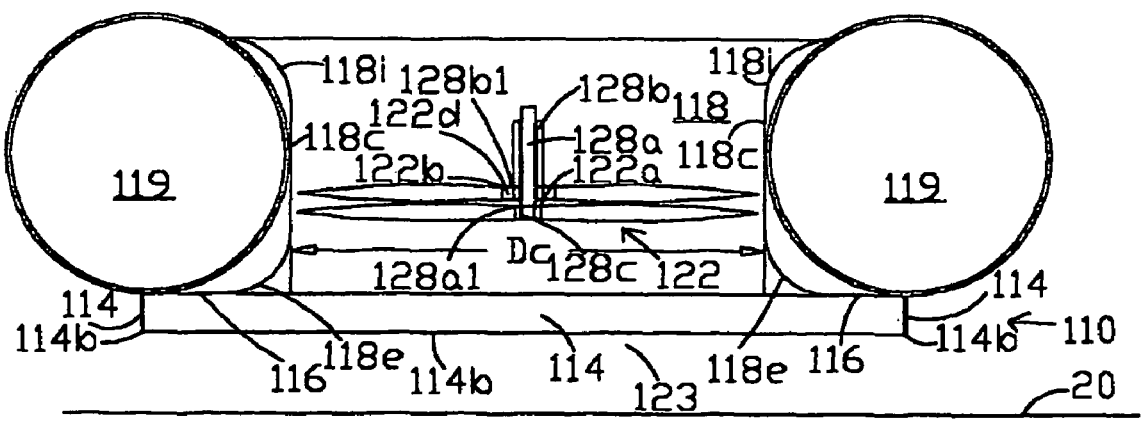

It will be obvious to one of ordinary skill in the art that human transporting levitating platform prototype 100, described above, is only one example of the various possible configurations that could be used for the levitating platform of the present invention without departing from the spirit of the invention. For example, as shown in FIG. 7A, monocoque body 112 could be hollowed around air-flow port 118 to reduce weight. In such a configuration, a light-weight structural frame (not shown) of aluminum, fiberglass or other such light-weight high-strength structural members could be used for rigidity. The body of the craft could be a lightweight plastic or fiberglass membrane, which is attached to the frame. Yet further, as shown in FIG. 7B, the body of the craft around air-flow port 118 could be a gas-inflatable bladder 119 of a suitable elastic fabric. Besides reducing weight, such construction would also allow for amphibious operation of the craft and reduce storage space requirements. Amphibious construction is well known in the art. Yet other modifications could be made to the above-described configuration of the levitating platform without departing from the spirit of the invention. For example, as shown in FIG. 7A, lip 114 could be molded as an integral part of monocoque body 112. To increase lift, lip 114 could be molded with a downwardly facing curved surface 114*a*. Yet further as shown in FIG. 7A, the basic levitating platform configuration can be modified with the addition of a peripheral flap/louver/tuning vane 114*f*. The purpose of flap 114*f* is to increase the lift of the fluid flow at the boundary and hence provide more lifting force for a given level of power. It will be quite obvious that more than one set of flaps may be used in a "stacked" configuration to further enhance lift. The flap can be a simple curved plane in cross section or may have an airfoil type cross-section as shown in FIG. 7A. Yet further, other air movement devices such as blowers and gas-turbines could also be used in the levitating platform of the present invention without deviating from the spirit of the invention. Yet further, multiple air blowing ducts could be used to increase the payload handling capacity of the craft.

While an internal combustion engine has been shown as the driving mechanism for the fans, other means of rotating the fans could also be practiced. For example, electric motors could also be used to rotate the fans. The electric motors could be driven by on-board batteries or fuel-cell systems. Alternately, turbine engines could also be used to rotate the fans. Such methods of rotating the fans are well-known in the art.

Figure 8A:
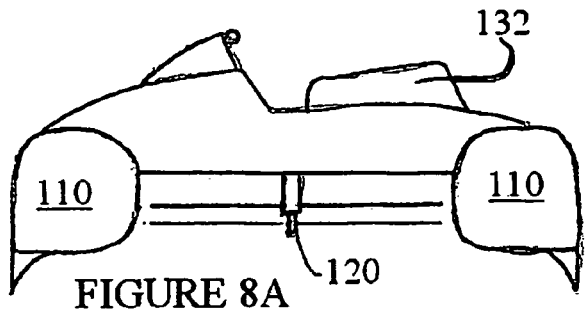
FIGS. 8A to 8E represent alternate configurations of the human transporting levitating platform prototype of FIG. 6A.
Figure 8B:
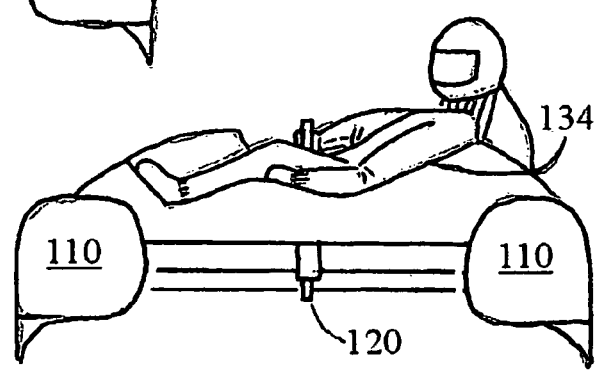
Figure 8C:
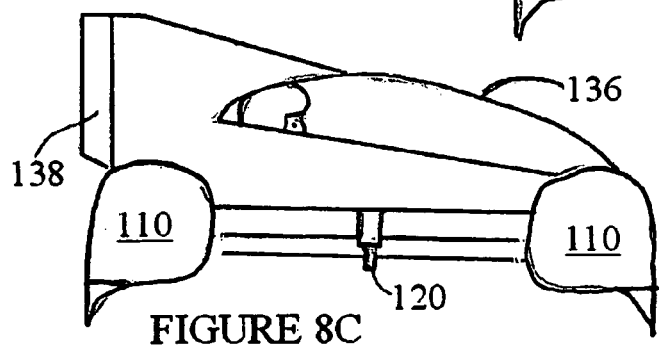
Figure 8E:
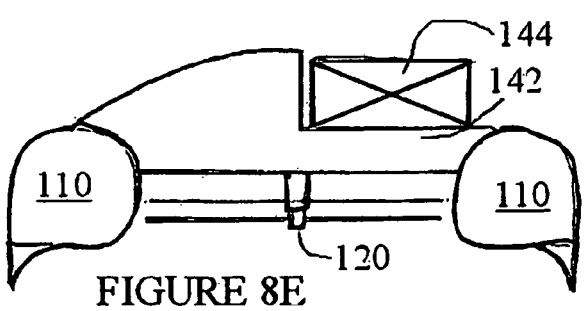
Figure 8D:
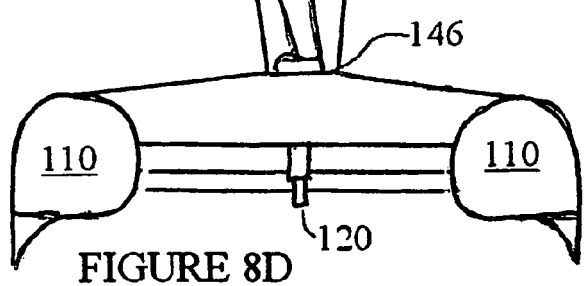

Further various other configurations of the levitating platform of the present invention can be practiced as represented in FIGS. 8A, 8B, 8C, and 8D. FIG. 8A shows a configuration of the levitating platform of the present invention wherein the rider sits on a saddle 132 during its operation. FIG. 8B shows another configuration of the levitating platform of the present invention wherein the rider reclines in a chair 134 during its operation. FIG. 8C shows a configuration of the levitating platform of the present invention wherein the rider sits inside an enclosed, aerodynamically optimized canopy 136. The levitating platform of FIG. 8C is further fitted with a conventional rudder 138 to facilitate the its steering FIG. 8D shows another configuration of the levitating platform of the present invention wherein the rider stands on a platform 146, which has railings 148 for additional support of the rider. FIG. 8E shows yet another configuration of the levitating platform of the present invention, which has a payload area 142. Other uses and configurations of the levitating platform of the present invention will be obvious to one of ordinary skill in the art.

Figure 9A:
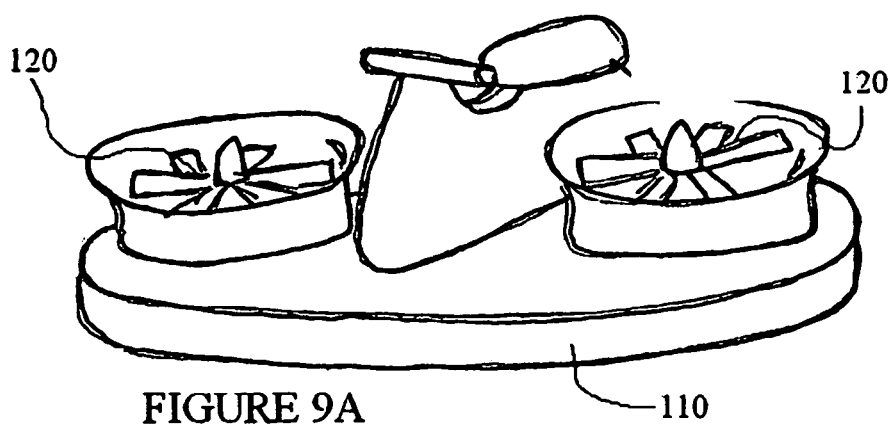
FIGS. 9A, 9B, and 9C represent alternate multi-fan configurations of the human transporting levitating platform prototype of FIG. 6A.
Figure 9B:
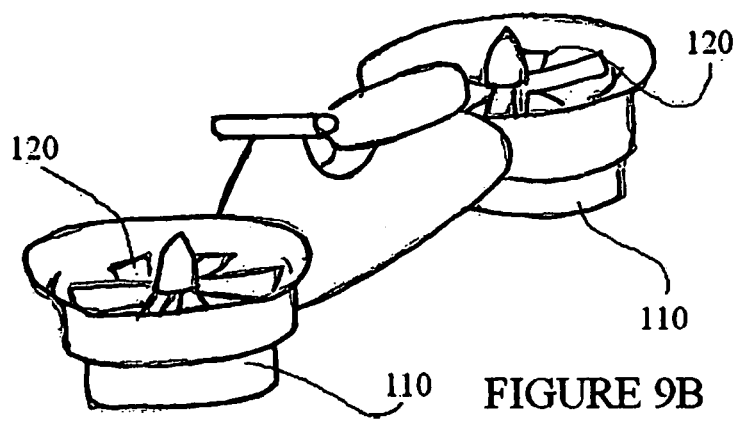
Figure 9C:
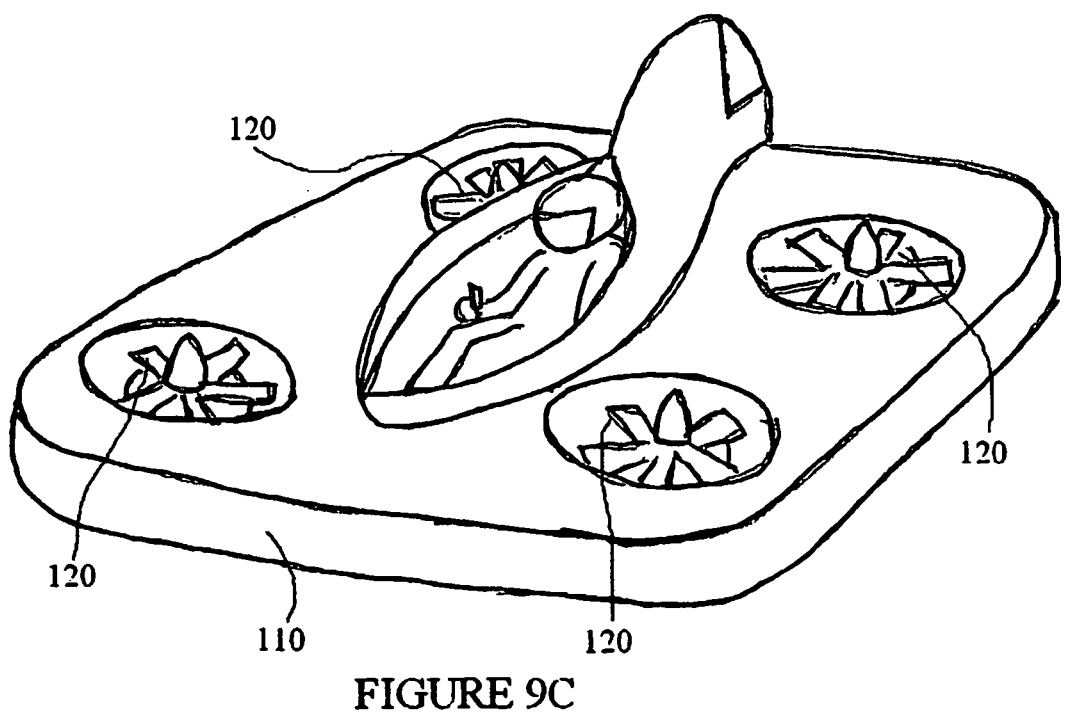

It will also be quite obvious from the above description that multiple air-movement devices could be used in the levitating platform of the present invention. FIGS. 9A and 9B show levitating platforms of the present invention, which are configured with two air-movement devices 120. Yet further, FIG. 9C shows a levitating platform, of the present invention, which is configured with four air-movement devices 120. Auxiliary thrusting devices could be added to provide control means or to propel the platform Miniature versions of the configurations of the levitating platform shown in FIGS. 8A-8E and 9A-9C can be used as toys with or without remote control capabilities.

The above description of the levitating platform of the present invention focuses on the levitational capabilities of a free floating levitating platform from a fixed support surface for use as a human and/or cargo transporter. However, the levitating platform of the present invention can also be used as an attractor to non-contactingly support work-pieces. In this mode of operation, the levitating platform of the present invention is held fixed while the support surface is allowed to move relative to the levitating platform.

Figure 10A:
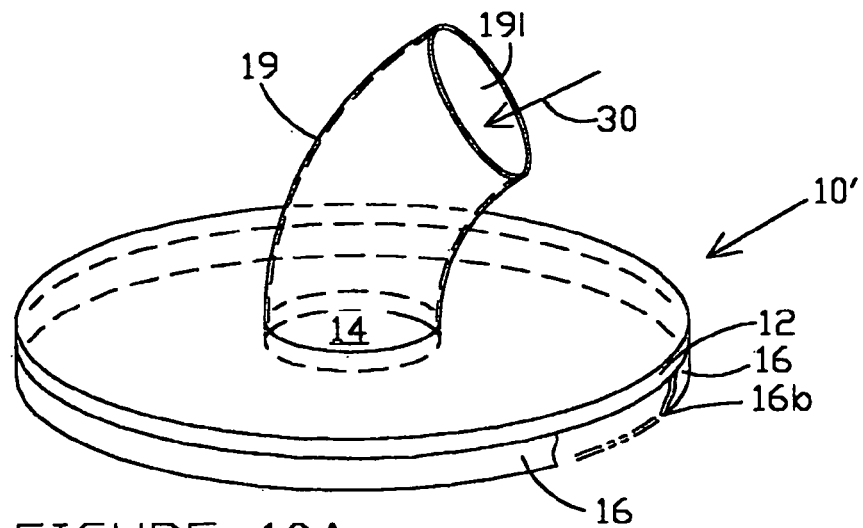
FIGS. 10A, 10B, and 10C represent the levitating platform of the present invention in its alternate application as an Attractor.
Figure 10B:
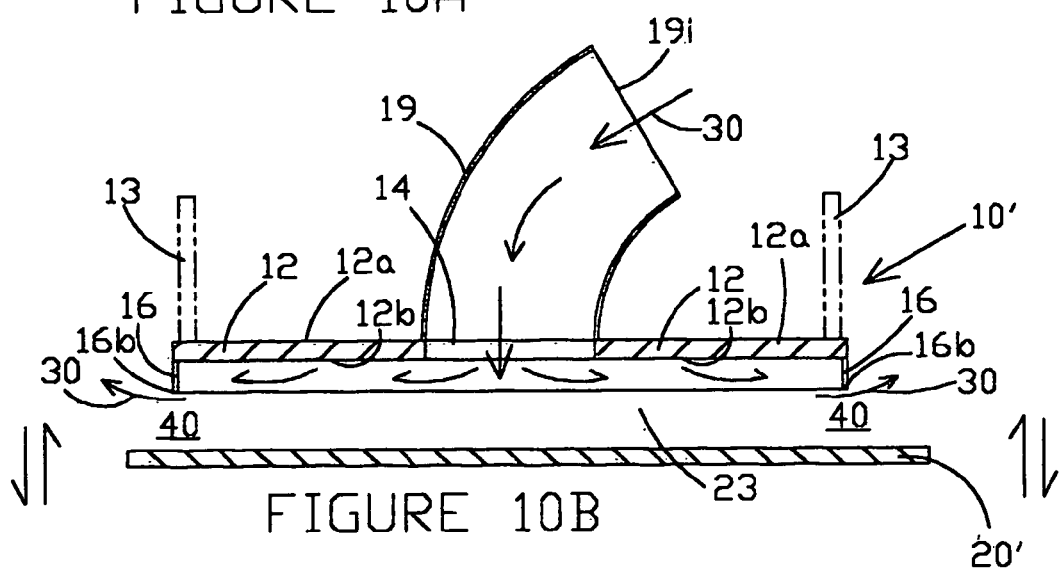
Figure 10C:
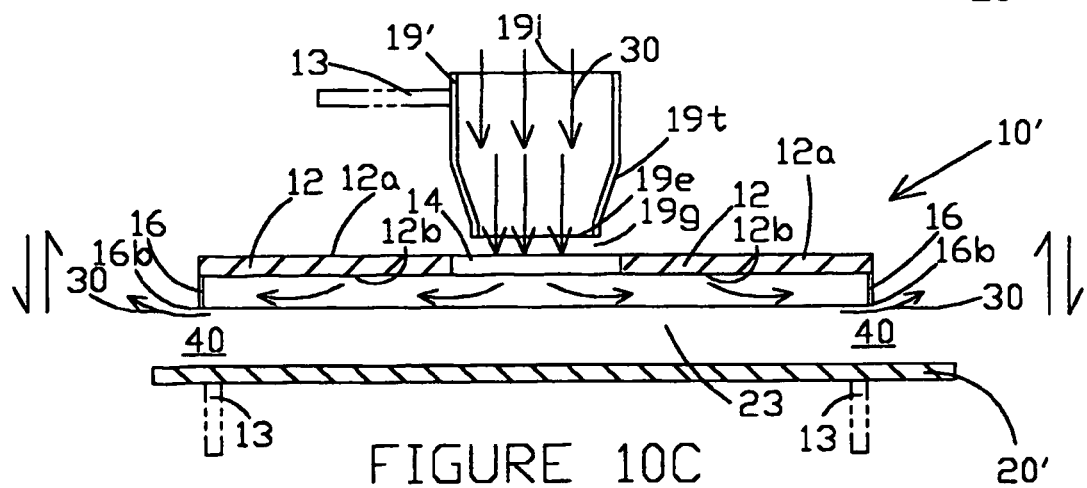

As an example. FIGS. 10A and 10B show a levitating platform, according to the present invention, which is used as attractor 10' to non-contactingly support work-pieces such as steel coils or computer chip wafers or a compact disc or similar object.

Attractor 10' is similar in construction and operation to levitating platform 10 as shown in FIG. 1. Attractor 10' also comprises disc 12 and lip 16. However, as shown in FIG. 10B, disc 12 of attractor 10' is held stationary by any conventional attachment means 13 to prevent its movement. As shown in FIG. 10B, work-piece 20*w* is allowed to move relative to attractor 10'. Work-piece 20*w* is non-contactingly held in an equilibrium floating position with a gap 40 between its surface 20*s* and edge 16*b* of lip 16 by the negative pressure created in plenum 23 (as described with respect to FIG. 2A) by the flow of a fluid therein. Work-piece 20*w* could be a steel sheet coil in a coil coating line or a computer chip wafer.

In the attractor embodiment of the present invention shown in FIGS. 10A and 10B, a fluid 30 is supplied to plenum 23 through opening 19*b* of a fluid supply conduit 19. However, a fluid movement device, such as air movement device 18 as shown for FIG. 1, can also be used to provide fluid 30 to attractor 10'. Fluid 30 could air, water, or any other suitable fluid which follows Bernoulli's principle.

As described previously for the embodiment of the present invention shown in FIG. 1, attractor 10' will posses both repelling and attracting capabilities. As attractor 10' is moved towards the opposing surface of work-piece 20*w*, the net fluid dynamic equilibrium results in increasing repelling forces. As attractor 10' is moved away from the opposing surface of work-piece 20*w*, the net fluid dynamic equilibrium results in increasing attracting forces until the maximum attractive force is reached. As gap 40 between edge 16*b* of attractor 10' and surface 20*s* of work-piece 20*w* is further increased, the attractive forces diminish.

In another aspect of the attractor of the present invention, fluid conduit 19' and work-piece 20*w* are held fixed by conventional attachment means 13 and disc 12 is allowed to move relative to fluid conduit 19' and work-piece 20*w*. Fluid conduit 19' is shaped similar to a nozzle with a tapered outlet section 19*t*. Air 30 is flowed through inlet end 19*i* of fluid conduit 19' and exits through outlet end 19*e* of tapered outlet section 19*t*. The velocity of air 30 at outlet 19*e* is higher than at inlet 19*i* since the area of outlet 19*e* is less than the area of inlet 19*i*. The diameter of outlet 10*e* is selected to be somewhat less than the diameter of flow opening 14 in disc 12. Further, outlet 19*e* is positioned with a gap 19*g* from flow opening 14 in disc 12. Air 30 exits outlet opening 19*e* and enters plenum 23. The flow of air 30 in plenum 23 creates positive and negative forces within plenum 23. However, since work-piece 20*w* and fluid conduit 19' are held stationary by attachment means 13, disc 12 moves relative to work-piece 20*w* and fluid conduit 19' until it reaches an equilibrium floating position between work-piece 20*w* and fluid conduit 19'.

The applicant has been able to empirically demonstrate that each of the above configurations of the levitating platform of the present invention, which he tested as described in the preceding section of this description, possessed both repelling and attracting capabilities. The attractive capabilities were enhanced as the extended surface plan-form area is increased relative to the fluid inlet plan-form area and/or as the lip depth was decreased.

While the foregoing describes the use of one attractor of the present invention, it will be obvious that more than one attractor can be used to precisely position the work-piece in space. For example, one attractor can be positioned above the work-piece and the second attractor can be positioned below the work-piece. By varying the fluid flow-rate in each attractor, the attracting and repelling forces can be precisely controlled to move the work-piece to the desired equilibrium position in between the two attractors. Yet other numbers and arrangements of multiple attractors will be obvious to one of ordinary skill in the art.

It is contemplated that practical applications of the present invention will exist whereby both attractive and repelling capabilities will be useful. Besides, the examples given above, another example of the use of attractor 10' of the present invention would be to provide non-contact traversing and surveying of an underwater vessel, such as a ship's hull or an off-shore drilling rig's submerged superstructure, at very close proximity. Yet another example of the use of attractor 10' would be as a wall-walking or ceiling-walking carriage for a robotic tool to carry out repairs in hard to access places in buildings. A further example of the use of attractor 10' would be as a wall-walking or ceiling-walking toy.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. Further, it will be apparent to those of skill in the art that numerous changes may be made in such details without departing from the spirit and the principles of the invention. The scope of the invention, therefore, should be defined solely by the following claims.

TABLE 1A

GREEN SERIES TESTS

| | | | | | |
|---|---|---|---|---|---|
| Number of Fans: | | 1 | | | |
| Fan Diameter: | | 26.67 cm | | 10.5 inches | |
| Lip Height: | | 12.7 | | 0.5 inch | |

| Test No. | Fan Diameter (cm)/ Duct Area A1 (sq. cm.) | Extended Surface Diameter (cm)/ (Extended Area A2) (sq. cm.) | Ratio of Areas A2/A1 | Weight of Test Levitating Platform (gms) | Initial Lift-Off Voltage (V) | Maximum Lift-Off Height (mm) | Observations |
|---|---|---|---|---|---|---|---|
| 1 | 26.7 | 26.7 | | 525 | 5 | 76 | Unstable |
| | 559 | 0 | — | | | | Operation |
| 2 | 26.7 | 26.7 | | 509 | 5.5 | 102 | Unstable |
| | 559 | 0 | — | | | | Operation |
| 3 | 26.7 | 56.5 | | 648 | 2 | 22 | Extremely stable |
| | 559 | 1950 | 3.49 | | | | in pitch, roll and elevation |
| 4 | 26.7 | 44.7 | | 610 | 2.5 | 22 | Extremely stable |
| | 559 | 1011 | 1.81 | | | | in pitch, roll and elevation |
| 5 | 26.7 | 34.7 | | 565 | 4 | 25 | Extremely stable |
| | 559 | 386 | 0.69 | | | | in pitch, roll and elevation |
| 6 | 26.7 | 32 | | 546 | 4.5 | 27 | Extremely stable |
| | 559 | 226 | 0.40 | | | | in pitch, roll and elevation |
| 7 | 26.7 | 30 | | 541 | 5 | 38 | Extremely stable |
| | 559 | 131 | 0.24 | | | | in pitch, roll and elevation |

Notes:
Test 1: Model based on U.S. Pat. No. 6,464,459 FIGS. 100 and 201 using 6 inch diameter central disc and 4 stator blades to create toroidal flow as suggested by patent.
Test 2: Ducted fan model based on U.S. Pat. No. 6,464,459 FIGS. 800b without central disc.

TABLE 1B

BLUE SERIES TESTS

| | | | | | |
|---|---|---|---|---|---|
| Number of Fans: | | 1 | | | |
| Fan Diameter: | | 6.35 cm | | 2.5 inches | |
| Lip Height | | 12.7 | | 0.5 inch | |

| Test No. | Fan Diameter (cm)/ Duct Area A1 (sq. cm.) | Extended Surface Diameter (cm)/ (Extended Area A2) (sq. cm.) | Ratio of Areas A2/A1 | Weight of Test Levitating Platform (gms) | Initial Lift-Off Voltage (V) | Max Lift-Off Height (mm) | Observations |
|---|---|---|---|---|---|---|---|
| 1 | 6.4 | 36.8 | | 185 | 4.2 | 6 | Very stable |
| | 32 | 1034 | 32.64 | | | | in pitch, roll and elevation |

TABLE 1B-continued

| | | | | | | |
|---|---|---|---|---|---|---|
| 2 | 6.4 | 15.2 | | 135 | 4.2 | 6 | Very stable |
| | 32 | 151 | 4.76 | | | | in pitch, roll and elevation |
| 3 | 6.4 | 10.2 | | 126 | 8.7 | 10 | Very stable |
| | 32 | 49 | 1.56 | | | | in pitch, roll and elevation |
| 4 | 6.4 | 7.0 | | 125 | | | Operation unstable |
| | 32 | 7 | 0.21 | | | | |
| 5 | 6.4 | 6.4 | | 135 | | | Operation unstable |
| | 32 | 0 | 0 | | | | |
| 6 | 6.4 | 15.2 | | 135 | 4.2 | 6 | Very stable |
| | 32 | 151 | 4.76 | | | | in pitch, roll and elevation |
| 7 | 6.4 | 15.2 | | 135 | 4.2 | 6 | Very stable |
| | 32 | 151 | 4.76 | | | | in pitch, roll and elevation |
| 8 | 6.4 | 36.8 | | 185 | | | Stable |
| | 32 | 1034 | 32.64 | | | | in pitch, roll and elevation |
| 9 | 6.4 | 36.8 | | 185 | 4.2 | 13 | Very stable |
| | 32 | 1034 | 32.64 | | | | in pitch, roll and elevation |
| 10 | 6.4 | 26.7 | | 185 | | 19 | Very stable |
| | 32 | 527 | 16.64 | | | | in pitch, roll and elevation |

Notes:
Test 4: Model not stable enough to test because of small extended surface.
Test 5: Lip placed at inside diameter of 6 inch diameter extended surface. Model not stable.
Test 8: Fan separated from disc. Fan air directed through flow opening in disc.
Test 9: Model supported upside down on downwards facing support surface. Attractive forces generated by model balanced the gravitational force and prevented it from falling down.
Test 10: Model operated in attractor mode to lift 10.5 inch foam disc weighing 42.5 grams at a gap of about 8 mm.

EXHIBIT 1C

RED SERIES TESTS

| Number of Fans: | 2(Counter-Rotating) | |
|---|---|---|
| Fan Diameter: | 36.195 cm | 14.25 inches |
| Lip Height: | 12.7 | 0.5 inch |

| Test No. | Fan Diameter (cm)/ Duct Area A1 (sq. cm.) | Extended Surface Diameter (cm)/ (Extended Area A2) (sq. cm.) | Ratio of Areas A2/A1 | Weight of Test Levitating Platform (gms) | Initial Lift-Off Voltage (V) | Max Lift-Off Height (mm) | Observations |
|---|---|---|---|---|---|---|---|
| 1 | 36.2 | 43.8 | | 703 | 4.8 | 32 | Very stable |
| | 1029 | 479 | 0.465374 | | | | in pitch, roll and elevation |
| 2 | 36.2 | 41.3 | | 694 | 5.2 | 38 | Very stable |
| | 1029 | 309 | 0.3004 | | | | in pitch, roll and elevation |
| 3 | 36.2 | 41.3 | | 687 | 5.5 | 38 | Very stable |
| | 1029 | 309 | 0.3004 | | | | in pitch, roll and elevation |
| 4 | 36.2 | 40.0 | | 685 | 5.6 | 38 | Stable |
| | 1029 | 228 | 0.221607 | | | | in pitch, roll and elevation |
| 5 | 36.2 | 38.7 | | 667 | 5.7 | 41 | Stable |
| | 1029 | 149 | 0.145275 | | | | in pitch, roll and elevation |
| 6 | 36.2 | 37.5 | | 662 | 5.9 | | Unstable |
| | 1029 | 73 | 0.071407 | | | | |
| 7 | 36.2 | 36.2 | | 657 | 6.3 | | Unstable |
| | 1029 | 0 | 0 | | | | |
| 8 | 36.2 | 41.3 | | 691 | 5.3 | | Stable |
| | 1029 | 309 | 0.3004 | | | | in pitch, roll and elevation |
| 9 | 36.2 | 41.3 | | 696 | 5.24 | | Unstable |
| | 1029 | 309 | 0.3004 | | | | |
| 10 | 36.2 | 43.8 | | 713 | | 51 | |
| | 1029 | 479 | 0.465374 | | | | |

Notes:
Test 8: Model fitted with 1 inch lip.
Test 9: Model fitted with 1.5 inch lip.
Test 10: Model fitted with 1 inch lip.

I claim:

1. A levitating platform comprising: a flow means for generating a fluid flow, the flow means further comprising a fluid flow port and a fluid flow conduit connected at its first end to the fluid flow port and at its second end to a source of fluid, the fluid flow directed towards an opposing surface; and platform structure for arranging the flow means, the platform structure having an extended flow surface generally surrounding the flow means, the platform structure further having a protuberance boundary around the extended flow surface, the extended surface, the protuberance boundary and the opposing surface cooperating to form a generally closed fluid plenum, wherein the flow of the fluid flow past the extended surface and the protuberance boundary creates positive and negative pressure within the fluid plenum such that the positive pressure generates a repelling action between the platform structure and the opposing surface and the negative pressure generates an attractive action between the platform structure and the opposing surface.

2. The levitating platform of claim 1, wherein the source of fluid comprises a fluid-pump and the fluid-pump further comprises an air-fan.

3. The levitating platform of claim 2, wherein the air-fan comprises propeller blades.

4. A levitating platform comprising: a flow means for generating a fluid flow, the fluid flow directed towards an opposing surface; and platform structure for arranging the flow means, the platform structure having an extended flow surface generally surrounding the flow means, the platform structure further having a protuberance boundary around the extended flow surface, the protuberance boundary further comprising a ribbon, the extended surface, the protuberance boundary and the opposing surface cooperating to form a generally closed fluid plenum, wherein the flow of the fluid flow past the extended surface and the protuberance boundary creates positive and negative pressure within the fluid plenum such that the positive pressure generates a repelling action between the platform structure and the opposing surface and the negative pressure generates an attractive action between the platform structure and the opposing surface.

5. A method for creating attracting and repelling forces in a levitating platform, the levitating platform comprising a flow means for generating a fluid flow, the flow means further comprising a fluid flow port and a fluid flow conduit connected at its first end to the fluid flow port and at its second end to a source of fluid, the levitating platform further comprising a platform structure for arranging the flow means, the platform structure having an extended flow surface generally surrounding the flow means, the platform structure further having an protuberance boundary around the extended flow surface, the method comprising the steps of: placing the platform structure adjacent to an opposing surface such that the extended surface, the protuberance boundary and the opposing surface cooperate to form a generally closed fluid plenum; and directing the fluid flow into the closed fluid plenum such the fluid travels past the extended surface area and the protuberance boundary to create positive and negative pressure within the fluid plenum, the positive pressure generating a repelling action between the platform structure and the opposing surface and the negative pressure generating an attracting action between the platform structure and the opposing surface.

6. The method of claim 5, wherein the source of fluid comprises a fluid-pump and the fluid-pump further comprises an air-fan.

7. The method of claim 6, wherein the air-fan comprises propeller blades.

8. The method of claim 6, wherein the air-fan comprises a blower impeller.

9. A method for creating attracting and repelling forces in a levitating platform, the levitating platform comprising a flow means for generating a fluid flow, the levitating platform further comprising a platform structure for arranging the flow means, the platform structure having an extended flow surface generally surrounding the flow means, the platform structure further having an protuberance boundary around the extended flow surface, the protuberance boundary further comprising a ribbon, the method comprising the steps of:

placing the platform structure adjacent to an opposing surface such that the extended surface, the protuberance boundary and the opposing surface cooperate to form a generally closed fluid plenum; and directing the fluid flow into the closed fluid plenum such the fluid travels past the extended surface area and the protuberance boundary to create positive and negative pressure within the fluid plenum, the positive pressure generating a repelling action between the platform structure and the opposing surface and the negative pressure generating an attracting action between the platform structure and the opposing surface.

* * * * *